June 17, 1924.

R. L. DICKSON 1,498,428

CHILD'S VEHICLE

Filed Oct. 16, 1922

Robert L. Dickson
INVENTOR

BY Victor J. Evans
ATTORNEY

WITNESS:

June 17, 1924.
R. L. DICKSON
CHILD'S VEHICLE
Filed Oct. 16, 1922
1,498,428
2 Sheets-Sheet 2
Fig. 3.
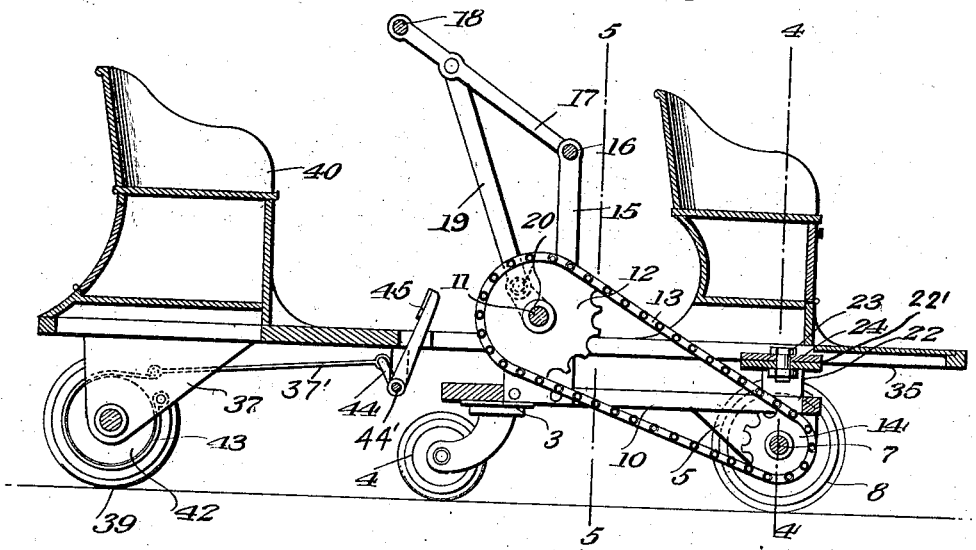
Fig. 4.
Fig. 5.
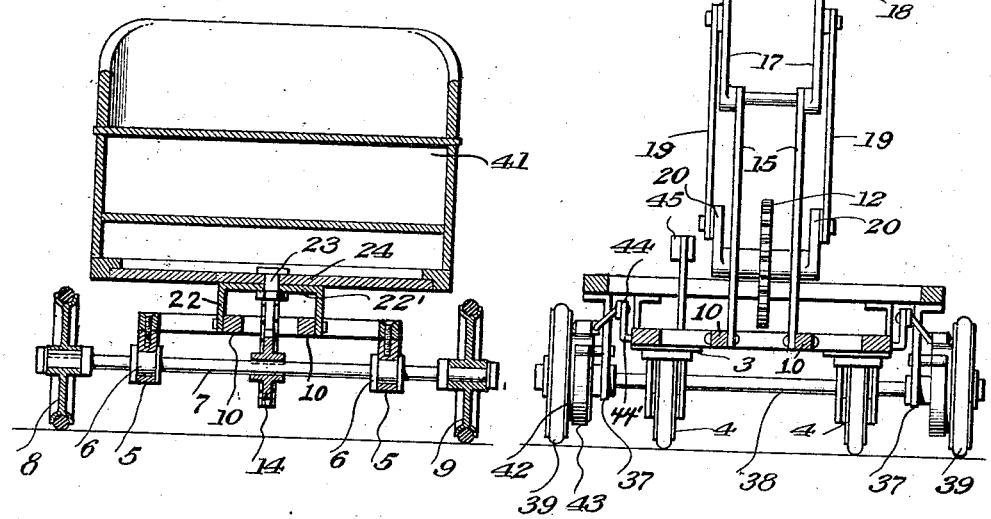
Robert L. Dickson
INVENTOR
BY Victor J. Evans
ATTORNEY
WITNESS:

Patented June 17, 1924.

1,498,428

UNITED STATES PATENT OFFICE.

ROBERT LEE DICKSON, OF PARKIN, ARKANSAS.

CHILD'S VEHICLE.

Application filed October 16, 1922. Serial No. 594,896.

*To all whom it may concern:*

Be it known that I, ROBERT LEE DICKSON, a citizen of the United States, residing at Parkin, in the county of Cross and State of Arkansas, have invented new and useful Improvements in Children's Vehicles, of which the following is a specification.

My present invention has reference to a hand propelled toy vehicle.
In carrying out my invention I propose to produce a toy vehicle that shall include a truck and a carriage which is pivotally supported at the front of the truck, said truck having lever operated means for turning the front wheels thereof, and said means being arranged for convenient operation by an occupant of the carriage, and also wherein the pivotal connection between the truck and carriage permits of the operator properly guiding the vehicle.

The foregoing, and many other objects which will present themselves as the nature of the invention is better understood, may be accomplished by a construction, combination and operative association of parts such as is disclosed by the drawings which accompany and which form part of this application.

In the drawings:—
Figure 1 is a side elevation of a toy in accordance with this invention.

Figure 3 is a sectional view on the line 3—3 of Figure 2.
Figure 4 is a sectional view on the line 4—4 of Figure 3.

Figure 5 is a sectional view on the line 5—5 of Figure 3.

Figure 1:
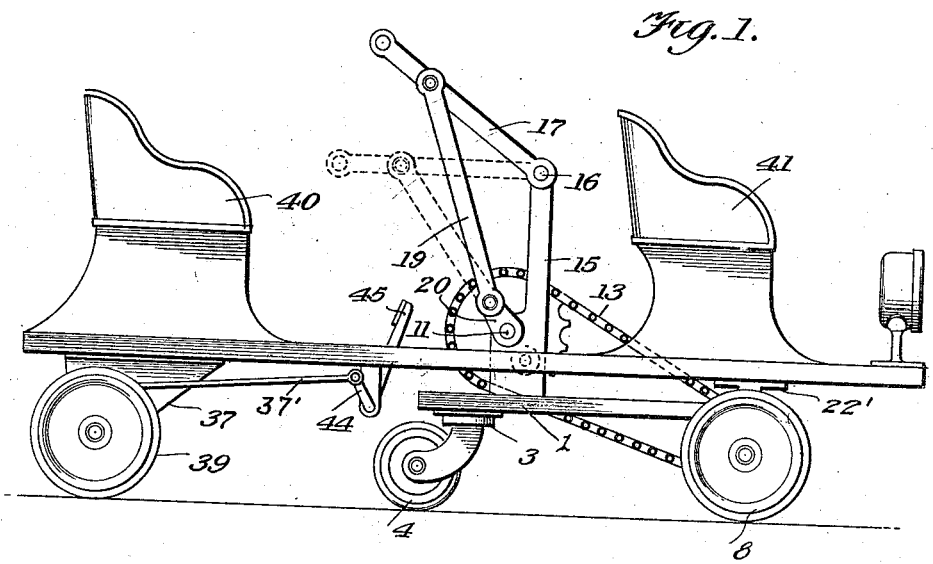
Figure 2:
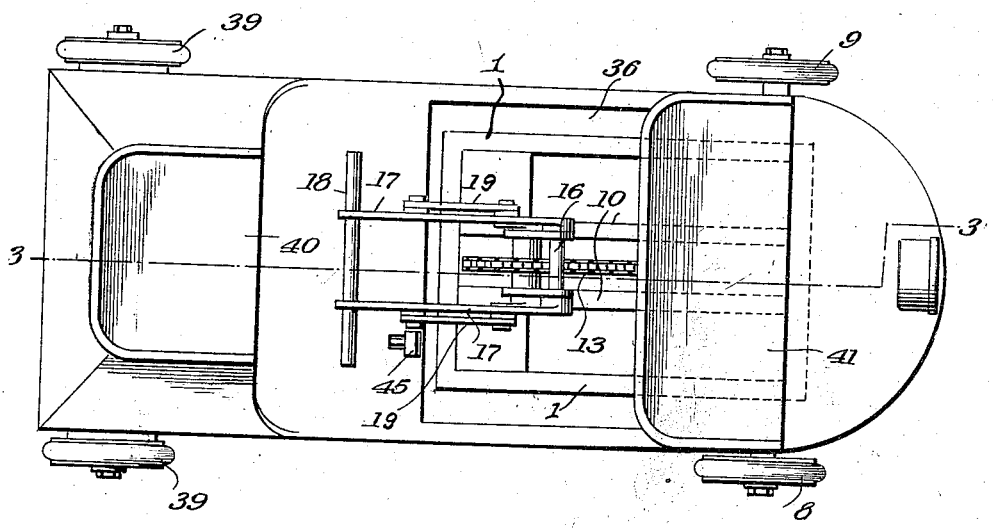
Figure 2 is a top plan view thereof.

As disclosed by the drawings, my manually propelled toy comprises two wheeled bodies. One of these bodies I will, for the sake of convenience, hereinafter refer to as the truck and the other body as the carriage.

The body of the truck comprises a substantially rectangular frame 1. At its rear corners there are journaled in the truck frame, forks 3 for rollers 4. At its outer corners the truck frame is provided with depending lugs 5 in which are bearings 6 for a shaft 7. Fixed on one end of the shaft 7 is a wheel 8, and loosely journaled on the opposite end of the shaft is a wheel 9.

The truck frame includes inner longitudinal bars 10. These bars are spaced equidistantly from the center of the truck. Secured to these bars 10 are uprights 15. Journaled in bearings in the lower and widened ends of the uprights 15 is a shaft 11 which has keyed thereon a sprocket wheel 12. Around this sprocket wheel there is trained an endless chain 13 which is likewise directed around a sprocket wheel 14 fixed on the shaft 7.

The shaft 11 has cranked ends 20 to which are pivoted links 19, the links in turn being pivoted to arms 17, each of which has one of its ends pivoted, as at 16 to one of the uprights or standards 15. The free ends of the arms 17 are connected by a handle member 18.

To the bars 10, at the forward end of the truck frame are secured parallel arms 22 which depend from a disk that provides a fifth wheel 22'. The disk underlies and has resting thereon the rounded central portion of a plate 24 that is secured to the under face of the carriage body. Passing through the fifth wheel 22' and through the plate 24 is a pivot member which is preferably in the nature of a bolt 23. In this manner the truck is pivotally connected with the carriage.

The flat body portion of the carriage is indicated by the numeral 35 and has, adjacent its forward end an enlarged opening 36 disposed directly above the truck body and receiving therethrough the uprights or standards 15 which support the operating means for the crank shaft 11 as well as the sprocket wheel 12 and the upper lead of the chain 13.

The arms 17 and their handle 18 provide the operating lever for turning the crank shaft 11 and for swinging the truck in steering.

On the forward end of the carriage body 35 is a seat 41 for passengers and on the rear end of the body is a seat 40 for the operator. Depending from the rear of the body 35 are lugs 37 having bearing openings therethrough for a shaft 38 which has journaled on its ends wheels 39. On the inner face of each wheel is a brake drum 42 around which is trained a brake band 43. Each brake band has one end pivotally secured to the adjacent lug 37 and its other end pivotally secured to a link 37'. Each link is pivotally connected to the cranked ends 44 of a shaft 44' which is journaled in suitable lugs that depend from the body 35, and fixedly secured on the shaft 44 there is a foot pedal 45. A pressure on the foot pedal will draw the bands tight around the drums so that the vehicle may be quickly stopped to insure the safety of the operator and passengers.

It is believed that the construction, operation and advantages of the improvement will be apparent from the foregoing description when taken in connection with the drawings. As previously stated, the operator on the seat 40 actuates the lever, comprising the arms 17 and the handle 18 to reciprocate the links 19 and thereby turn the crank shaft 11 to impart motion to the chain 13 and the drive wheels 8 and 9. A side pressure by the operator on the operating lever will cause the swinging of the truck body on the carriage body so that the vehicle is thus guided in its course and by fixing the wheel 8 to the shaft 7 and by loosely journaling the wheel 9 on the shaft the vehicle is permitted to quickly round corners.

Having described the invention, I claim:—

A vehicle including a truck comprising a body having a revoluble shaft journaled at the forward end thereof and drive wheels on the shaft, caster wheels swiveled at the rear of the truck, a sprocket wheel on the axle of the drive wheels, a second sprocket wheel having a crank shaft journaled on the truck body, a chain trained around said sprocket wheels, a link connected to the crank, a lever having an operating handle pivotally supported above the truck body and pivotally connected to the link, and a carriage comprising a wheeled body which is pivotally supported from the body of the truck.

In testimony whereof I affix my signature.

ROBERT LEE DICKSON.